(12) United States Patent
Branson et al.

(10) Patent No.: US 9,916,471 B2
(45) Date of Patent: Mar. 13, 2018

(54) DATA SECURITY FOR A DATABASE IN A MULTI-NODAL ENVIRONMENT

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 904 days.

(21) Appl. No.: 13/674,241

(22) Filed: Nov. 12, 2012

(65) Prior Publication Data

US 2013/0074146 A1    Mar. 21, 2013

Related U.S. Application Data

(63) Continuation of application No. 13/150,651, filed on Jun. 1, 2011, now abandoned.

(51) Int. Cl.
*G06F 17/30* (2006.01)
*G06F 21/62* (2013.01)

(52) U.S. Cl.
CPC .............. *G06F 21/6227* (2013.01)

(58) Field of Classification Search
CPC .................................. G06F 21/6227
See application file for complete search history.

(56) References Cited

U.S. PATENT DOCUMENTS 5,978,940 A * 11/1999 Newman et al. ............ 714/712
6,038,563 A    3/2000 Bapat et al.
(Continued)

FOREIGN PATENT DOCUMENTS

CN    1285067 A    2/2001
CN    1776701 A    5/2006
(Continued)

OTHER PUBLICATIONS

Alves-Foss et al.,"A Multi-layered Approach to Security in High Assurance Systems"; Proceedings of the 37th International Conference on System Sciences, 2004, 10 pages.
(Continued)

*Primary Examiner* — Huawen A Peng
(74) *Attorney, Agent, or Firm* — Martin & Associates, LLC; Bret J. Petersen (57) ABSTRACT

A security mechanism in a database management system enforces processing restrictions stored as metadata to control how different pieces of a multi-nodal application are allowed to access database data to provide data security. The security mechanism preferably checks the data security restrictions for security violations when an execution unit attempts to access the data to insure the nodal conditions are appropriate for access. When the security mechanism determines there is a security violation by a query from an execution unit based on the security restrictions, the security mechanism may send, delay or retry to maintain data security. Nodal conditions herein include time restrictions and relationships with other columns, rows or pieces of information. For example, multiple processing units may execute together, but the security mechanism would prohibit these processing units to access specific pieces of information at the same time through the use of metadata in the database.

7 Claims, 4 Drawing Sheets

(56) References Cited

U.S. PATENT DOCUMENTS

| | | | |
|---|---|---|---|
| 6,158,010 A | 12/2000 | Moriconi et al. | |
| 6,195,694 B1 | 2/2001 | Chen et al. | |
| 6,226,745 B1 * | 5/2001 | Wiederhold | 726/1 |
| 6,236,996 B1 | 5/2001 | Bapat et al. | |
| 6,389,543 B1 | 5/2002 | Dawson et al. | |
| 6,578,037 B1 | 6/2003 | Wong et al. | |
| 6,820,082 B1 | 11/2004 | Cook et al. | |
| 7,065,588 B2 * | 6/2006 | Konda et al. | 709/246 |
| 7,478,402 B2 * | 1/2009 | Christensen et al. | 719/313 |
| 7,539,857 B2 | 5/2009 | Bartlett et al. | |
| 7,623,846 B2 | 11/2009 | Hybre et al. | |
| 7,904,454 B2 | 3/2011 | Raab | |
| 7,917,495 B1 * | 3/2011 | Chapman et al. | 707/713 |
| 8,166,541 B2 | 4/2012 | Furuya | |
| 8,316,051 B1 | 11/2012 | Burns et al. | |
| 8,544,065 B2 | 9/2013 | Archer et al. | |
| 2006/0179296 A1 | 8/2006 | Bartlett et al. | |
| 2007/0239471 A1 | 10/2007 | Patton et al. | |
| 2007/0271234 A1 | 11/2007 | Ravikiran | |
| 2008/0091682 A1 | 4/2008 | Lim | |
| 2009/0138938 A1 | 5/2009 | Harrison et al. | |
| 2009/0276419 A1 * | 11/2009 | Jones et al. | 707/5 |

FOREIGN PATENT DOCUMENTS

| | | |
|---|---|---|
| CN | 1822019 A | 8/2006 |
| CN | 1828592 A | 9/2006 |
| CN | 101782942 A | 7/2010 |
| CN | 101925907 A | 12/2010 |

OTHER PUBLICATIONS

Bertino, Elisa, "Data Hiding and Security in Object-Oriented Databases"; Genova Univ., Italy; IEEE Proceedings. Eighth International Conference, 1992, pp. 338-347.

The preliminary discussion of distributed computation and file protection, Dec. 31, 2010.

Er-chong Liao et al., "Extended RBAC Model and Application", Computer Engineering and Design, vol. 29, No. 7, Apr. 30, 2008, pp. 1608-1613.

David Dobkin et al, "Secure Databases: Protection Against User Influence", 1979.

Naser S. Barghouti et al, "Concurrency Control in Advanced Database Applications", 1991.

* cited by examiner

Security Restrictions Metadata  126

| Database Entity | Restrictions |
|---|---|
| Table A | Don't allow simultaneous access to this Table by Execution unit (X) and Execution unit (Y)  316 |
| Table A | Queries to Table A are restricted when Execution Unit "X" has accessed Table B within Time "T"  318 |
| Table A, Table B | Queries restricted when the number of execution units accessing the database exceeds a threshold.  320 |
| Table A, Row A1 | Queries to this Row are restricted when Execution Unit "X" has value "V1" in a tuple to be processed  322 |
| Table A, Row A1 | Queries to this Row are restricted when outside connections to resource Node2 are open.  324 |

DATA SECURITY FOR A DATABASE IN A MULTI-NODAL ENVIRONMENT

BACKGROUND

1. Technical Field

This disclosure generally relates to computer systems, and more specifically relates to data security for a database in a multi-nodal computer system environment.

2. Background Art

Distributed computing systems are increasingly being employed to overcome the limitations of traditional applications deployed in standard computing systems. A distributed computing system consists of multiple autonomous computers or nodes that communicate through a network. Distributed computing refers to the use of distributed systems to solve computational problems. In distributed computing, a problem is divided into many tasks, each of which is solved by one or more computer nodes. Distributed computing in a multi-nodal environment takes on many forms and can be exemplified by several of today's most promising computing technologies such as IBM® Corporation's Blue Gene®, grid computing, commercial clusters, and IBM® Corporation's RoadRunner. These new multi-nodal environments allow individual computer execution units to be linked to each other thru new programming paradigms such that a unit of work or a typical program is parsed out and computed in a distributed manner. Furthermore this spread of work is often left up to the system such that software designers have little or no way of knowing what pieces of the puzzle are running where.

In the typical application development environment, data security is implemented at an object level and relationships of that object with an application. An application depends on having access to certain objects based on security rules/roles and setup implemented at both the operating system and database level. While security based simply on access to objects by an application works fairly well in traditional computer systems, it does not address the security requirements of protecting data and allowing flexibility in accessing data in these more complex multi-nodal environments.

BRIEF SUMMARY

The disclosure and claims herein are directed to database security in a multi-nodal environment. A security mechanism as part of a database management system enforces processing restrictions stored as metadata in the database to control how different pieces of a multi-nodal application (called execution units) are allowed to access the database data to provide data security. The security mechanism preferably checks the data security restrictions for security violations when an execution unit attempts to access the data to insure the nodal conditions are appropriate for access. When the security mechanism determines there is a security violation by a query from an execution unit based on the security restrictions, the security mechanism may send, delay or retry to maintain data security. Nodal conditions herein include time restrictions and relationships with other columns, rows or pieces of information. For example, multiple processing units may be allowed to execute together, but the security mechanism would prohibit (through the usage of metadata) these processing units to access specific pieces of information at the same time.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Described herein is a security mechanism in a database management system that enforces processing restrictions stored as metadata to control how different pieces of a multi-nodal application are allowed to access database data to provide data security. The security mechanism preferably checks the data security restrictions for security violations when an execution unit attempts to access the data to ensure the nodal conditions are appropriate for access. When the security mechanism determines there is a security violation by a query from an execution unit based on the security restrictions, the security mechanism may send, delay or retry to maintain data security. Nodal conditions herein include time and relationships with other columns, rows or pieces of information. For example, multiple processing units may be allowed to execute together, but the security mechanism would prohibit (through the usage of metadata) these processing units to access specific pieces of information at the same time.

Figure 1:
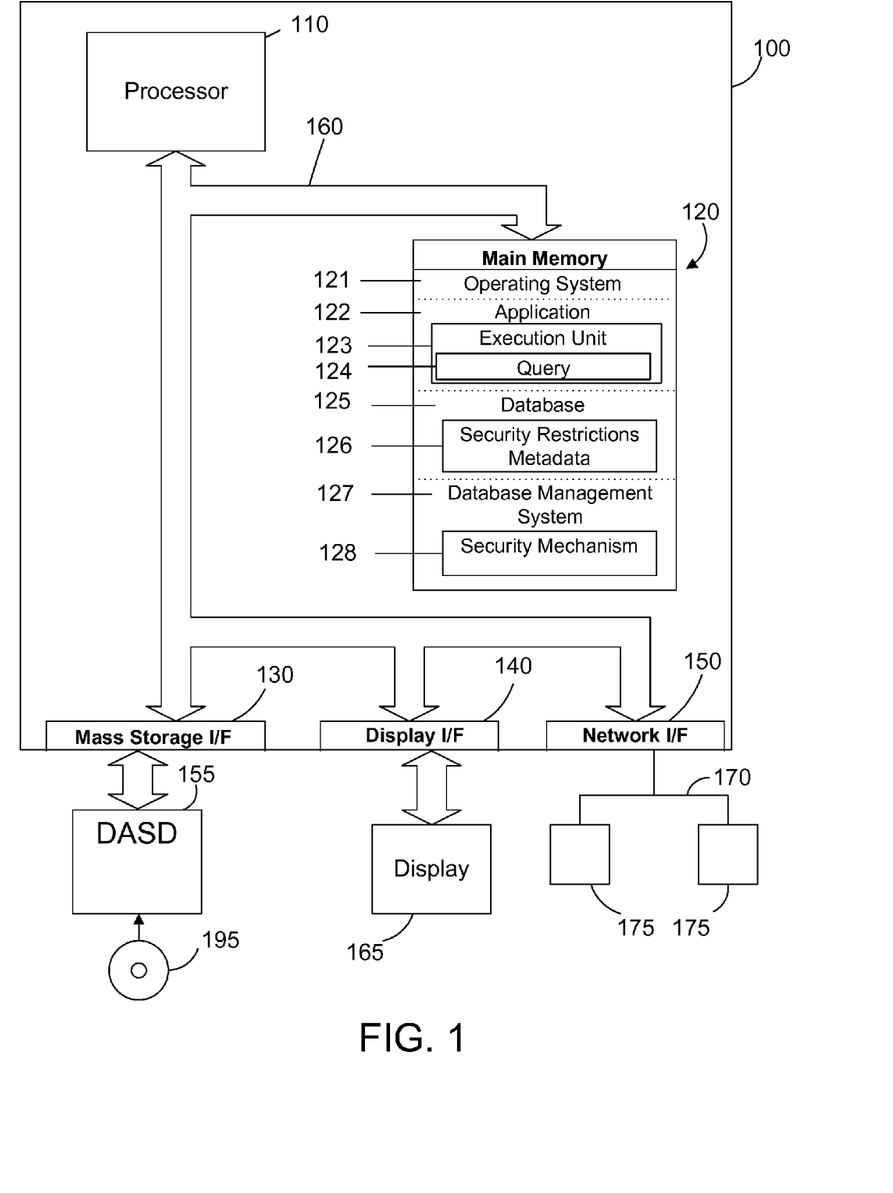
FIG. 1 is a block diagram a computer system with a security mechanism utilizing security restrictions metadata as described herein.

Referring to FIG. 1, a computer system 100 is one suitable implementation of a computer system that includes a security mechanism as described herein. Computer system 100 is an International Business Machines Corporation (IBM®) Power System which can run multiple operating systems including the IBM® i operating system. However, those skilled in the art will appreciate that the disclosure herein applies equally to any computer system capable of being connected in a multi-nodal computing environment. For example, the computer system 100 could also represent a single node of a massively parallel computer such as IBM® Corporation's Blue Gene® developed by IBM®, or a node of a scalable performance cluster such as a Beowulf cluster. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices with a computer readable medium, such as direct access storage devices 155, to computer system 100. One specific type of direct access storage device 155 is a readable and writable CD-RW drive, which may store data to and read data from a CD-RW 195.

Main memory 120 preferably contains an operating system 121. Operating system 121 is a multitasking operating system known in the industry as IBM® i operating system; however, those skilled in the art will appreciate that the spirit and scope of this disclosure is not limited to any one operating system. The memory further includes a software application 122 that comprises one or more execution units 123. The execution unit 123 includes at least one query 124 that queries a database 125. The database 125 includes security restrictions metadata 126 associated with database data (not shown). A database management system 127 manages access to the database 125. The database management system 127 includes a security mechanism 128 that restricts access to the database from queries by the execution units as described herein.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while operating system 121, application 122, execution unit 123, query 124, database 125, security restrictions metadata 126, database management system 127 and the security mechanism 128 are shown to reside in main memory 120, those skilled in the art will recognize that these items are not necessarily all completely contained in main memory 120 at the same time or even in the memory of the same computer system. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the application 122 and the execution unit(s) 123.

Although computer system 100 is shown to contain only a single processor and a single system bus, those skilled in the art will appreciate that a security mechanism as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

Figure 2:
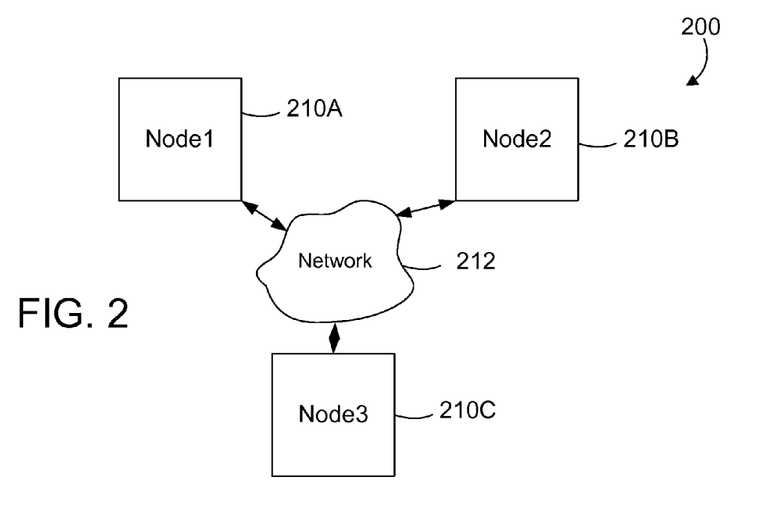
FIG. 2 is a block diagram that illustrates three compute nodes connected in a generic multi-nodal computer environment.

FIG. 2 illustrates a block diagram of a generic multi-nodal computer environment 200 also sometimes referred to as a cluster. The multi-nodal computer environment 200 is shown with three nodes 210A, 210B, 210C connected with a network 212. The network 212 can be any suitable network to connect the nodes 210 for distributed computing. Each node may represent a computer 100 with some or all the hardware, and memory components as shown in FIG. 1. Alternatively, each node of the computer system 200 could also represent a single node of a massively parallel computer such as IBM® Corporation's Blue Gene®, or a node of a scalable performance cluster such as a Beowulf cluster. At least one node includes a database management system with a security mechanism 128 (FIG. 1) that utilizes security restrictions metadata 125 (FIG. 1) to manage database security in a multi-nodal environment as described and claimed herein.

The security mechanism described herein is capable of providing security of data between execution units on one or more nodes of the distributed computer system environment. The security is not limited to security between execution units on the same node, but may also be provided between execution units on different nodes of the same type, execution units on the same trunk (set or group of nodes), execution units on the same physical or logical machine, or machines at the same physical location, etc. The security mechanism may also enforce security for execution units across an internet protocol (commonly know as TCP/IP). This would allow security across a range of IP addresses or a set of nodes based on their IP addresses. The security mechanism herein is capable of providing security in a distributed environment that may be a complete multi-nodal computer system or some portion of that system. The relevant portion of the computer system may be a combination of nodes, trunks, logical and physical machine breakdowns, locational breakdowns and IP breakdowns of a computer, where a breakdown is some logical or physical partitioning of the system. Node1 210A and Node2 210B shown in FIG. 2 can thus be considered to be nodes in any one of these distributed environments.

Figure 3:
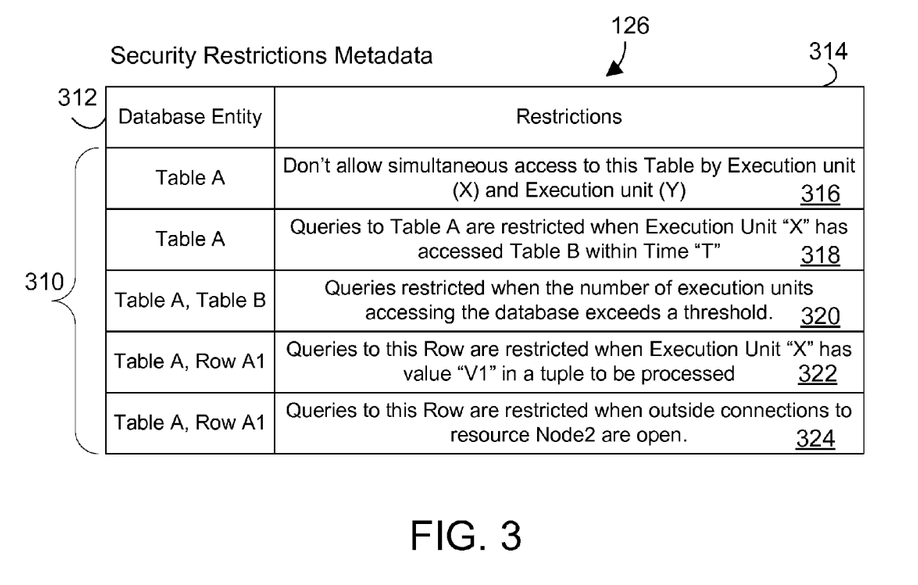
FIG. 3 is a block diagram that shows security restrictions metadata that specifies data relationships between execution units on two compute nodes.

FIG. 3 illustrates a table that represents one suitable implementation of security restrictions metadata 126 used by the security mechanism 128. The security restrictions metadata 126 is preferably a database table residing in the database but the data may reside elsewhere. The security restrictions metadata 126 includes a number of records 310 with security restrictions for relationships between execution units and database data. In the illustrated example, the records 310 of the security restrictions metadata 126 includes a database entity 312 for which the record is associated, and one or more restrictions 314 that identifies one or more execution units (123 FIG. 1). The security restrictions metadata 126 preferably is a file of records 310 stored in memory or in a data storage device inside or in conjunction with the database 125. The records 310 of the security restrictions metadata 126 may be expressed in any suitable format to show a logical condition between the relevant entities in the manner described below.

We will now consider some examples of security restrictions metadata. The following examples illustrate the security restrictions metadata 126 shown stored in the records 310 of FIG. 3. The first record 316 of security restrictions metadata 126 in FIG. 3 is a database restriction for a database Table A with restrictions concerning EU(X) (Execution Unit X) and EU(Y) (Execution Unit Y). This security restriction of record 316 is further illustrated in FIG. 4. Execution unit X 410 and Execution Unit Y 412 each represent a multi-nodal application or a portion of an application. The execution units in this example reside on different nodes shown in FIG. 2. The execution units 410, 412 are attempting to access a database 416 residing somewhere in the network space (FIG. 2) connected to the nodes containing the execution units. The database 416 in this example has a table A 418 and a table B 420. The security restriction in record 316 instructs the security mechanism 128 (FIG. 1) to prevent simultaneous access to database table A 418 by EU(X) 410 and EU(Y) 412.

Figure 4:
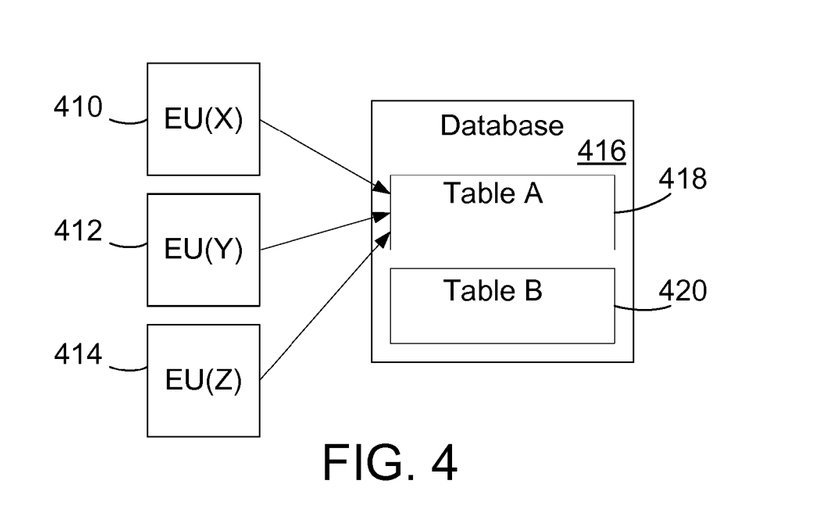
FIG. 4 is a block diagram that illustrates an example of how a security restrictions metadata instructs the security mechanism to insure data security for a database table.

The second record 318 of security restrictions metadata 126 in FIG. 3 is a database restriction similar to the previous example and also illustrated in FIG. 4. In this security restriction, queries to database Table A 418 are restricted for all other execution units when EU(X) 410 has accessed Table B 420 within a specified time period "T". A variation of this security restriction could restrict access to Table B 420 when EU(X) 410 has access Table B 420 within a time period "T".

Record 320 of security restrictions metadata 126 in FIG. 3 describes another security restriction illustrated in FIG. 4. In this security restriction, queries are restricted to database Table A 418 when then number of execution units accessing Table A 418 exceeds a threshold. In the Example shown in FIG. 4, access to Table A is restricted when there are more than 3 execution units accessing Table A. Since there are three execution units 410, 412 and 414 accessing Table A 418, any additional access to table A would be restricted by the security mechanism 128 (FIG. 1).

Figure 5:
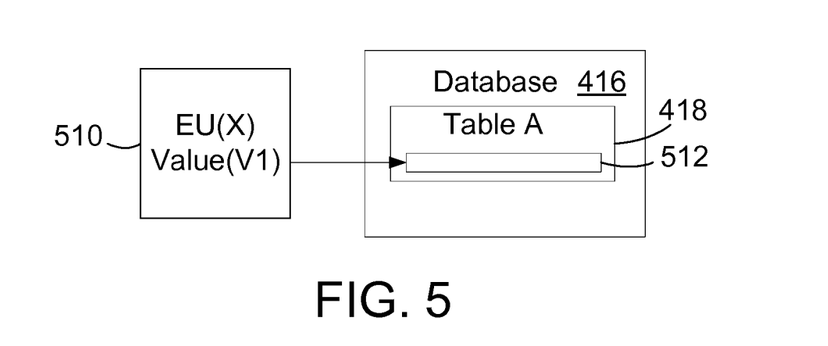
FIG. 5 is block diagram that illustrates another example of how a security restrictions metadata instructs the security mechanism to insure data security for a database table.

Record 322 of security restrictions metadata 126 in FIG. 3 describes another security restriction that is further illustrated in FIG. 5. In this security restriction, queries to a specific row (RowA1 512) of database Table A 418 are restricted when EU(X) 510 has a value "V1" in a tuple to be processed. For example, we assume an execution unit EU(X) 510 inputs a tuple with some attributes. These attributes are sent in to the execution unit strings. These attributes strings could include the strings identified as: EmployeeNumber, EmployeeTitle, and EmployeeData. If within the EmployeeData string the value "concerned" is found, then the security mechanism will not allow the execution unit EU(X) to perform certain data base operations such as access Table A, Row A1. In this example, the restrictions are described with reference to one execution unit, but the restriction could be more general with reference to execution units. This means a restriction could be used that is not tied to a specific execution unit. In another variation of this example, a value of the query from the execution unit may indicate a specific user on a node. The security restriction metadata could then indicate not allowing specific users to access specific data in the database.

Figure 6:
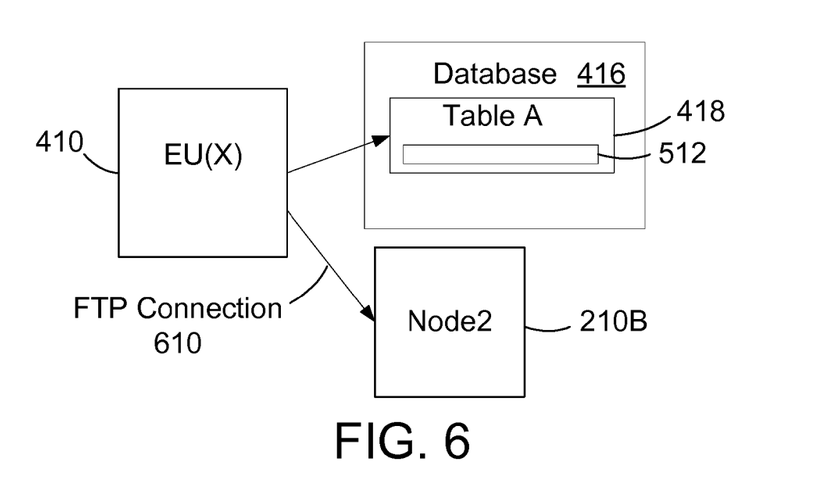
FIG. 6 is block diagram that illustrates another example of how a security restrictions metadata instructs the security mechanism to insure data security for a database table.

Record 324 of security restrictions metadata 126 in FIG. 3 describes another security restriction that is further illustrated in FIG. 6. In this security restriction, queries to a specific row (RowA1 512) of database Table A 418 are restricted depending on the status of outside connections to a resource. In this example, when there is an open file transfer protocol (FTP) connection 610 by EU(X) 410 to the resource Node 2 210B, the restriction metadata indicates to restrict access to database table A, RowA1 512. As used herein, an outside connection is could be any communications protocol or interface between nodes and execution units on the nodes. The example of file transfer protocol (FTP) is a common standard network protocol to copy data from one host to another over a network such as the internet.

The relationships contemplated herein are not limited to relationships between two execution units, but may extend to relationships covering a plurality of execution units. Likewise the relationship could cover a plurality of nodes or any logical or physical division of hardware. The disclosure and claims herein expressly extend to other relationships of time and relevant portions of the system described above.

In the examples described above, if the execution unit attempted to violate a security relationship described in the security restriction metadata. The security mechanism detected the attempted violation and then determines how to prevent the security violation. In the examples above, the security mechanism prevented the security violation by delaying the access to the data or returning null results. The security mechanism could also prevent the security violation by moving, or killing the execution unit. For example, if the security violation is a data violation, the security mechanism could move the execution unit or instruct the system to move the execution unit, perhaps with any data associated with the execution unit, to another node that would not violate the security relationship. If the execution unit cannot be delayed or moved to overcome the security violation, then the security mechanism could also kill the execution unit and log a security violation within the security mechanism and/or at another appropriate place within the system.

Figure 7:
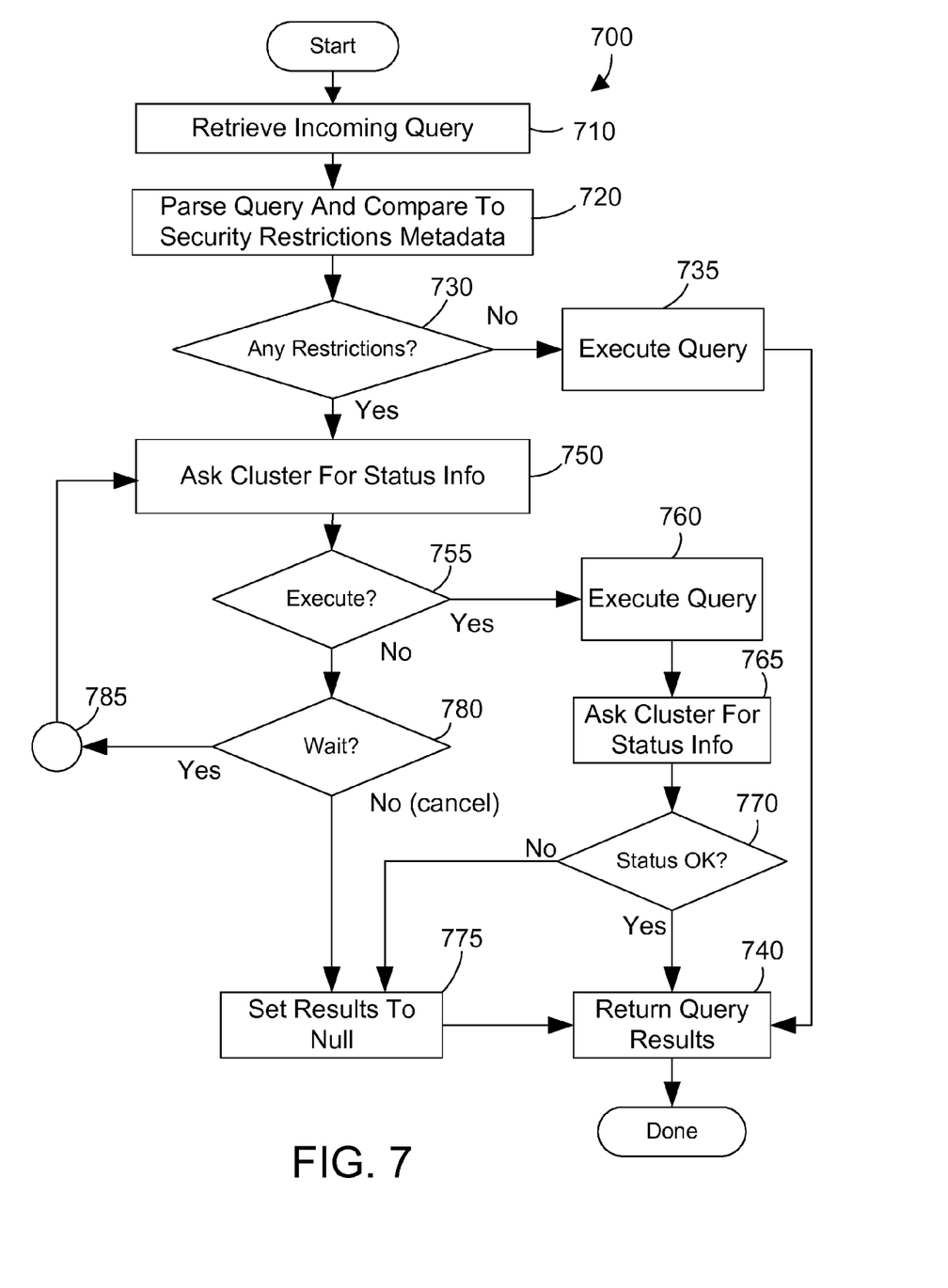
FIG. 7 is an example of a method flow diagram for a security mechanism to provide database security using security restrictions metadata in a database table.

FIG. 7 shows a method 700 for a security mechanism as claimed herein. The steps in method 700 are preferably performed by the security mechanism 128 (FIG. 1), but portions of the method may also be performed by other software associated with the computer system. First, retrieve an incoming query from an execution unit in the system (step 710). Next, parse the query for actions that are covered by the security relationships metadata. Determine if there are any security restrictions in the metadata that apply to the execution unit (step 720). If there are no security restrictions in the metadata that apply to the execution unit (step 730=no) then execute the query as normal (step 735), return the results of the query (step 740) and the method is done. If there are security restrictions in the metadata that apply to the execution unit (step 730=yes) then ask the cluster for status information (step 550) to compare to the restrictions in the metadata. If it is determined to execute the query where the status information does not violate the restrictions in the metadata (step 755=yes) then execute the query (step 760). As an optional step, again ask the cluster for status information and compare to the restrictions in the metadata to insure the security restriction is still valid (step 765). If the status is still ok (step 770=yes) then return the query results (step 740) and the method is done. If the status is not ok (step 770=no) then set the results to null (step 775) before returning the results (step 740). If it is determined no to execute the query (step 755=no) then determine whether to wait for a period of time or cancel the query (step 780). If it is determined to wait (step 780=yes) then wait a period of time 785 and return to step 750. If it determined to cancel the query (step 780=no) then set the results to null (step 775) and return the query results (step 740) and the method is done.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, a multi-nodal security mechanism enforces security constraints stored as security relationships in a database that control how different pieces of a multi-nodal application (called execution units) are allowed to execute to insure data security. The disclosure describes a security mechanism which provides a security architecture for a database in a distributed environment.

One skilled in the art will appreciate that many variations are possible within the scope of the claims. While the examples herein are described in terms of time, these other types of thresholds are expressly intended to be included within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method for data security in a multi-nodal computer system, the method comprising the steps of:
   (A) retrieving an incoming query from one of a plurality of execution units executing on a plurality of compute nodes, wherein the plurality of execution units comprise a portion of an application and wherein each execution unit has a unique identifier;
   (B) providing security restrictions stored as database metadata, wherein the security restrictions include a restriction with a logical condition between a first execution unit and a second execution unit to access data in the database, wherein the first execution unit is identified with a first identifier and the second execution unit is identified with a second identifier;
   (C) parsing the query and comparing the query to the security restrictions;
   (D) asking the multi-nodal computer system for status information;
   (E) determining whether to execute the query based on the query, the security restrictions metadata and the status information, wherein the security restrictions metadata includes the restriction with the logical condition between the execution unit identified by the first identifier and execution unit identified by the second identifier;
   (F) where it is determined in step (E) to execute the query, executing the query as retrieved from one of the plurality of execution units and returning results of the query;
   (G) where it is determined in step (E) not to execute the query, determining whether to wait a period of time, and where it is determined to wait a period of time returning to step D above;
   (H) wherein the method steps are implemented in a computer software program stored in computer memory and executed by a computer processor;
   (I) wherein the security restrictions metadata indicates that a query to a first table is restricted when an execution unit has accessed a second table within a specified time period; and
   (J) wherein a query from the first execution unit to access the first table is not executed when a query from the second execution unit has accessed the second table within the specified time.

2. The method of claim 1 further comprising the steps of: where it is determined in step (G) not to wait a period of time, setting a results to null and returning the query results.

3. The method of claim 1 further comprising the steps of: after executing the query above, again asking the multi-nodal computer system for status information, and where the status indicates there is still no security restriction, then returning the query results in step F.

4. The method of claim 1 wherein the security restrictions metadata indicates that a query to some database data is restricted when a plurality of execution units accessing the first database table exceeds a specified threshold number of execution units where the threshold number is greater than one.

5. A computer-implemented method for data security in a multi-nodal computer system, the method comprising the steps of:
   (A) retrieving an incoming query from one of a plurality of execution units on a plurality of compute nodes, wherein the plurality of execution units comprise a portion of an application and wherein each execution unit has a unique identifier;
   (B) providing security restrictions stored as database metadata, wherein the security restrictions include a restriction with a logical condition between a first execution unit and a second execution unit to access data in the database, wherein the first execution unit is identified with a first identifier and the second execution unit is identified with a second identifier;
   (C) parsing the query and comparing the query to the security restrictions;
   (D) asking the multi-nodal computer system for status information;
   (E) determining whether to execute the query based on the query, the security restrictions metadata and the status information, wherein the security restrictions metadata includes the restriction with the logical condition between the execution unit identified by the first identifier and execution unit identified by the second identifier;
   (F) where it is determined in step (E) to execute the query, executing the query as retrieved from one of the plurality of execution units and returning results of the query;
   (G) where it is determined in step (E) not to execute the query, determining whether to wait a period of time, and where it is determined to wait a period of time returning to step D above;
   (H) where it is determined in step (G) not to wait a period of time, setting query results to null and returning the query results;
   (I) after executing the query in step (F), asking the multi-nodal computer system for status information, and where the status information indicates there is still no security restriction, then returning the query results in step (F); and
   (J) wherein the security restrictions metadata indicates that a query to a first table is restricted when an execution unit has accessed a second table within a specified time period;
   (K) wherein a query from the first execution unit to access the first table is not executed when a query from the second execution unit has accessed the second table within the specified time; and
   (L) wherein the method steps are implemented in a computer software program stored in computer memory and executed by a computer processor.

6. The method of claim 1 wherein the security restrictions metadata indicates that a query to a row of a first table is restricted when an execution unit is processing a tuple with a specified value.

7. The method of claim 1 wherein the security restrictions metadata indicates that a query to a row of a first database data is restricted when a connection to a second node is open.

* * * * *